United States Patent [19]

Alfredson

[11] Patent Number: 5,065,867
[45] Date of Patent: Nov. 19, 1991

[54] HOT AND COLD LUNCH BOX FOR AUTOMOBILE TRAVEL

[76] Inventor: Henry M. Alfredson, P.O. Box 84, St. James, N.Y. 11780

[21] Appl. No.: 600,404

[22] Filed: Oct. 9, 1990

[51] Int. Cl.⁵ ...................... B65D 25/28; B65D 41/02
[52] U.S. Cl. ..................................... 206/542; 206/818; 220/94 R; 220/230; 224/42.01; 296/152
[58] Field of Search ................................. 206/541–550, 206/818; 220/4.27, 94 R, 230, 660; 224/42.01, 273; 296/152

[56] References Cited

U.S. PATENT DOCUMENTS

| 265,742 | 10/1882 | Boteler | 206/549 |
|---|---|---|---|
| 1,874,882 | 8/1932 | Brown | 206/545 |
| 2,496,296 | 2/1950 | Lobl | 206/545 |
| 2,499,254 | 2/1950 | Parker | 206/545 |
| 2,645,332 | 7/1953 | Martin et al. | 206/546 |
| 3,255,607 | 6/1966 | Bair et al. | 206/545 |
| 3,384,259 | 5/1968 | Hoffstadt | 206/550 |
| 3,701,558 | 10/1972 | Baker | 220/94 R |
| 3,811,559 | 5/1974 | Carter | 206/545 |
| 4,110,552 | 8/1978 | Lombardi | 220/230 |
| 4,444,324 | 4/1984 | Grenell | 206/545 |

FOREIGN PATENT DOCUMENTS

| 2064615 | 12/1971 | Fed. Rep. of Germany | 220/230 |
|---|---|---|---|
| 2459765 | 2/1981 | France | 206/545 |
| 0167055 | 6/1989 | Japan | 220/230 |

Primary Examiner—Jimmy G. Foster

[57] ABSTRACT

This invention pertains to an insulated lunch box that is able to maintain different items such as food and drink at different temperatures. It is composed of two compartments or sections, each able to maintain its contents hot or cold. The lunch box is intended for use when traveling in a vehicle such as an automobile, truck or RV. It is able to use the vehicle's warm hood to heat food. This lunch box can also be used to protect the locks of a vehicle from freezing rain and ice storm by covering and insulating them.

3 Claims, 3 Drawing Sheets

HOT AND COLD LUNCH BOX FOR AUTOMOBILE TRAVEL

BACKGROUND

My invention solves the problem of storing two items of dissimilar temperature. It also can be used to warm food with the use of an automobile and it can protect the locks of that auto from freezing rain and ice storms.

This invention makes it possible to transport two foods that must be kept at different temperatures, such as ice cream and a hot sandwich.

Also, because of the unique construction of this lunch box, we gain several features not normally found in other lunch boxes. One such feature is the ability to warm food with the use of an automobile.

Unlike common lunch boxes, my unit has a magnetic strip that allows either compartment of the lunch box to adhere to the metal surface of an automobile. This makes it possible to fasten one or both halves of the lunch box to a hot surface of an automobile, such as the hood, which is normally hot when the engine is hot. The hood also may be hot from solar energy.

By placing the hot and cold lunch box on the hood of an auto, we create a warming chamber. The food in the chamber can be warmed while the automobile is traveling.

Another feature of the hot and cold lunch box is its ability to protect the door locks and handles of an automobile. Since it is constructed of a high thermal barrier material and adheres to the metal surface of an automobile, it can be used to protect the automobile's door locks and handles from freezing rain and ice storms.

DETAILED DESCRIPTION OF DRAWINGS

This invention pertain to a means of storing food or any other item so that it will be kept hot or cold, depending on the temperature of the item when it is placed in the storage sections 1 and 2.

Figure 1:
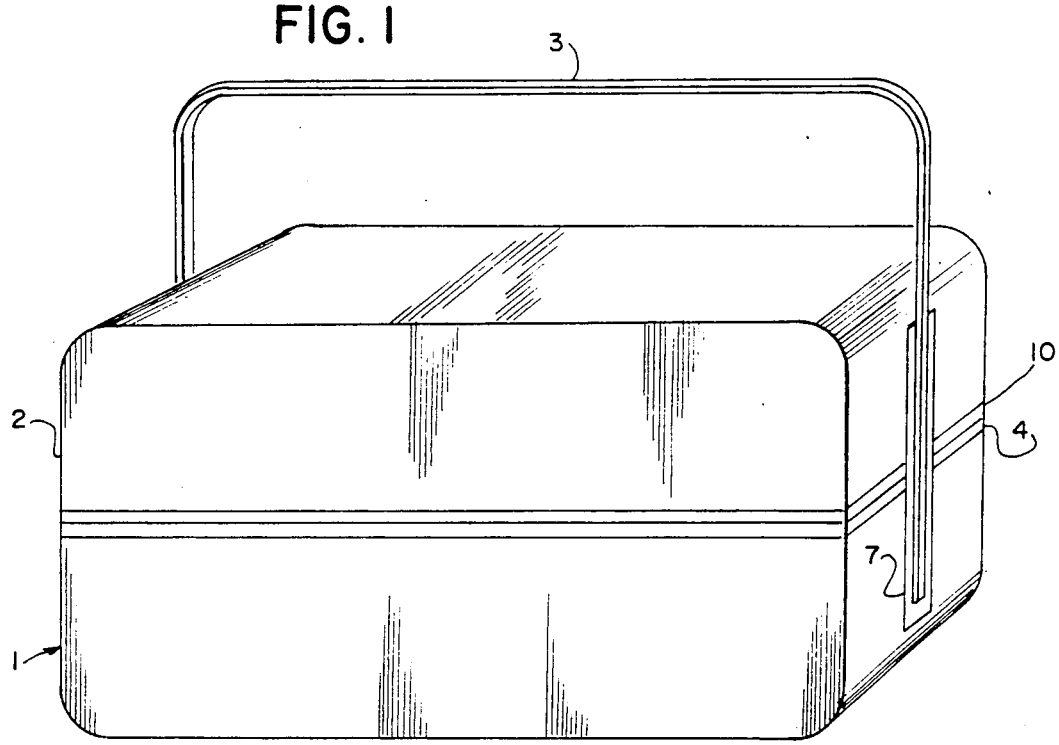
FIG. 1 shows the two insulating storage sections and handle as a fully assembled unit.
Figure 2:
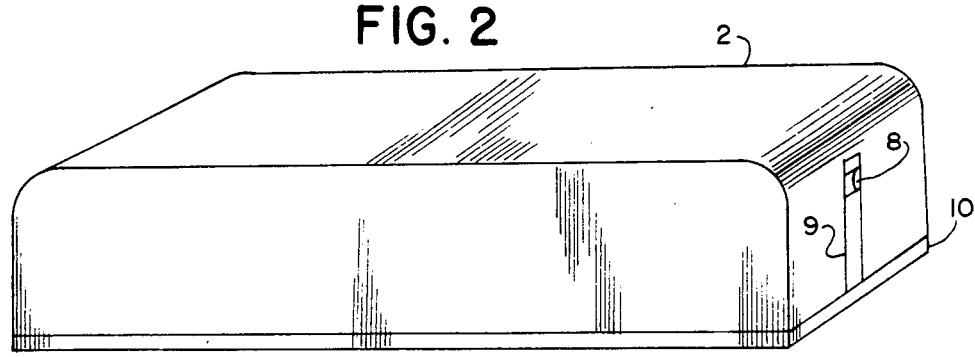
FIG. 2 is the upper insulating storage section.
Figure 3:
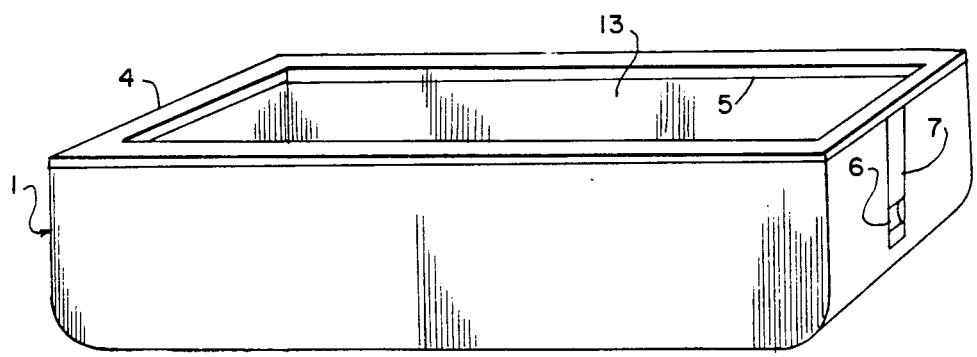
FIG. 3 is the lower insulating storage section.
Figure 4:
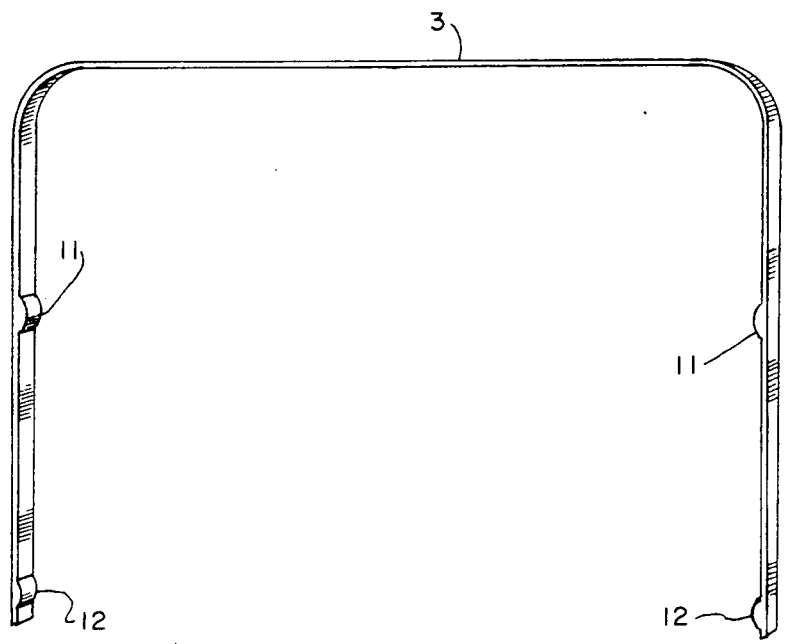
FIG. 4 shows the basic form of the handle.
Figure 5:
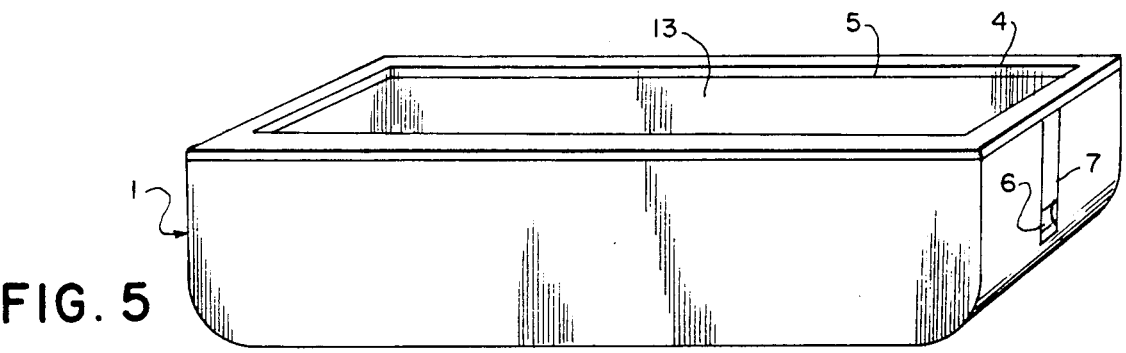
FIG. 5 is the lower insulating storage section with the insulating cover on it.
Figure 6:
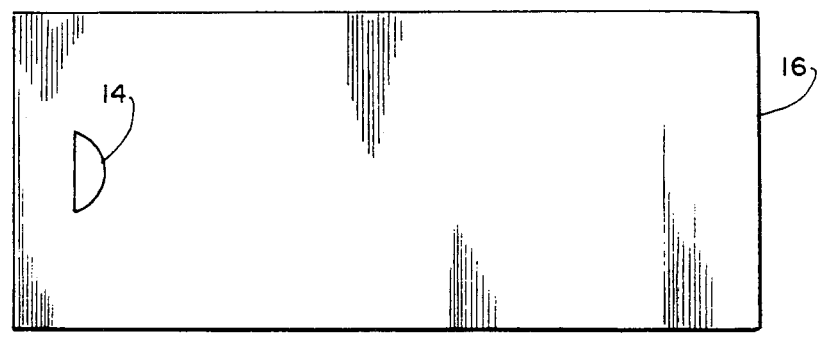
FIG. 6 shows the insulating cover that is used to seal the insulating storage section. Two of these covers are used, one for each of the two insulated storage sections.
Figure 7:
FIG. 7 shows a side view of the cover which is shown in FIG. 6.

This storage unit is constructed of styrofoam or any other high thermal barrier material FIG. 1. The unit is comprised of two halves 1 and 2. Each of these halves or sections has an internal compartment 13 and a magnetic strip 10 and 4 along the outer rim or edge 5. Also an insulating cover 16, which has a flat surface 15, is used to seal each of these sections. This cover has an opening 14. This cover helps separate the two sections 1 and 2 and thereby section 1 does not affect the temperature in section 2.

The magnetic strips 10 and 4 help keep the two compartments joined together and tight during transportation. During transportation the handle 3 also serves as a means of maintaining the two compartments in position. This handle 3 is placed in position by sliding it into the grooves 7 and 9 on the side of sections 1 and 2. The handle is also held in place by the notches 6 and 8 on 1 and 2 that mate with the protrusions 11 and 12 on the handle 3.

When 1 and 2 are brought together along 10 and 4, they form two totally sealed containers. These containers are able to store hot things hot and cold things cold. They are also able to store and maintain the temperature of two foods that must be kept at different temperatures. Since the two sections are insulated and isolated from each other it is possible to maintain one food hot while maintaining another cold.

An additional benefit to this structure is that when each of the halves 1 and 2 are placed on a metal surface (ferrous), such as a car, they each form a sealed container. Thus food that is kept in the storage unit cold can be removed and placed under one or both of the sections 1 and 2 on the hot surface of an automobile or truck and heat the food before serving. In this way, the storage unit is used as a cooler and also as a food warmer.

Figure 8:
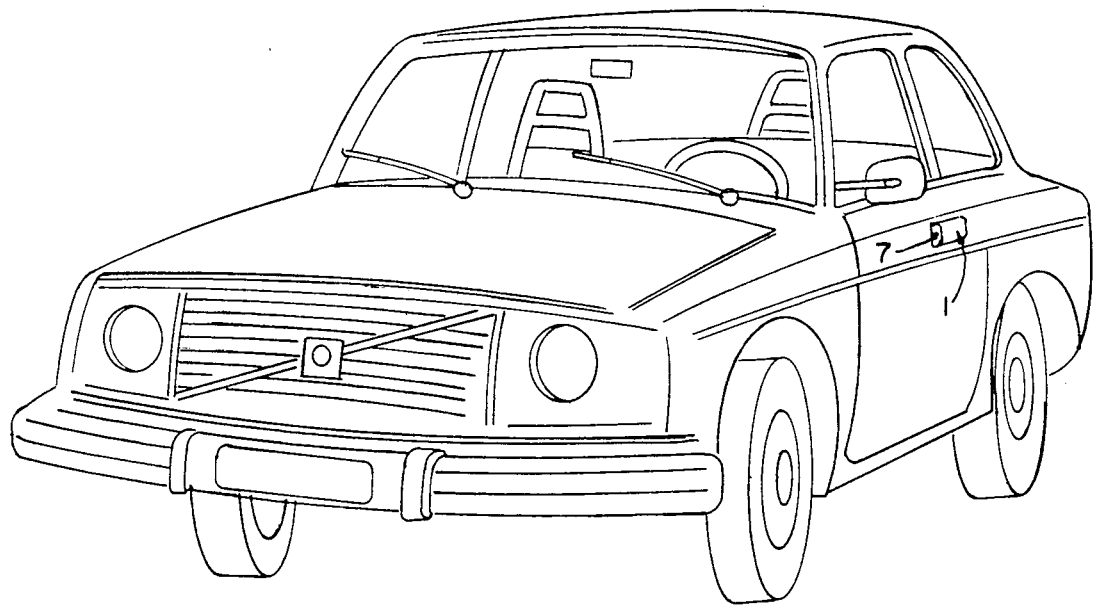
FIG. 8 shows an insulating storage section of the invention being used for protecting an automobile door handle and lock.
Figure 8A:
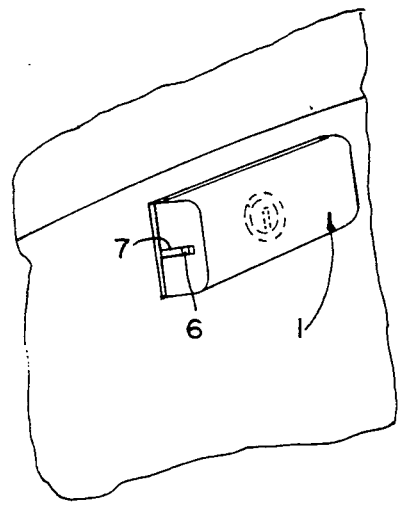
FIG. 8a shows a close-up view of the invention as being used in FIG. 8.

The sections can also be used to protect any ferrous metal surface from heat and cold, such as protecting car locks from freezing weather. See FIGS. 8 and 8a Since this lunch box is intended for automotive or truck travel and the sections 1 and 2 have the ability to adhere to the ferrous metal surface, it becomes possible to use the sections 1 and 2 to protect the handles and locks of the vehicle from freezing ice or snow. This can be achieved by simply placing section 1 over the driver's side door handle and lock and placing section 2 over the passenger side door handle and lock.

I claim:

1. An insulated lunch box comprising
    A pair of receptacles, each adapted to hold food, said receptacles comprising sections of said lunch box, each receptacle being made predominantly of high thermal barrier material, each receptacle having a mouth having a magnetic material at its periphery, whereby the magnetic material of both receptacles constitute means for attaching said receptacles to each other at the mouths of said receptacles, and whereby said magnetic material of each respective receptacle also constitutes means to attach said respective receptacle over the lock and handle on a vehicle, said receptacles each being adapted to placed over said vehicle lock and handle; and
    insulating means for closing each receptacle whereby food may be kept at different temperatures in the receptacles.

2. The lunch box as set forth in claim 1, further including a handle means for carrying said lunch box, said handle means including a handle receiving groove in each receptacle and a handle adapted to be placed in said groove.

3. The lunch box as set forth in claim 2, wherein said handle means further including protrusions on said handle and notches in said groove for retaining said handle in said groove.

* * * * *